United States Patent
Yamauchi

(10) Patent No.: US 7,924,737 B2
(45) Date of Patent: Apr. 12, 2011

(54) SIGNAL DEGRADE DETECTING METHOD, SIGNAL RESTORATION DETECTING METHOD, DEVICES FOR THOSE METHODS, AND TRAFFIC TRANSMISSION SYSTEM

(75) Inventor: Toshiro Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 705 days.

(21) Appl. No.: 11/690,247

(22) Filed: Mar. 23, 2007

(65) Prior Publication Data

US 2007/0230364 A1    Oct. 4, 2007

(30) Foreign Application Priority Data

Mar. 31, 2006   (JP) ................................. 2006-100621

(51) Int. Cl.
*H04L 12/56* (2006.01)
(52) U.S. Cl. ..................... 370/253; 370/310; 370/328
(58) Field of Classification Search .......... 370/252–253, 370/310, 328
See application file for complete search history.

(56) References Cited

U.S. PATENT DOCUMENTS

| | | | | |
|---|---|---|---|---|
| 5,448,593 | A * | 9/1995 | Hill | 375/267 |
| 6,085,106 | A * | 7/2000 | Sendonaris et al. | 455/522 |
| 6,148,423 | A * | 11/2000 | Le Mouel et al. | 714/708 |
| 6,643,612 | B1 * | 11/2003 | Lahat et al. | 702/186 |
| 6,683,944 | B2 * | 1/2004 | Fushimi | 379/93.26 |
| 6,757,255 | B1 * | 6/2004 | Aoki et al. | 370/252 |
| 6,791,944 | B1 * | 9/2004 | Demetrescu et al. | 370/235 |
| 7,342,879 | B2 * | 3/2008 | Gentle | 370/230 |

* cited by examiner

*Primary Examiner* — Phuc Tran
(74) *Attorney, Agent, or Firm* — Sughrue Mion, PLLC

(57) ABSTRACT

A method of detecting a signal degrade of transmission data, a method of detecting a restoration from a signal degrade, and a signal restoration detecting device are provided. The method of detecting a signal degrade includes measuring a discarded data rate of traffic; and comparing said discarded data rate with a threshold value to detect the signal degrade. The method of detecting restoration from a signal degrade includes obtaining a first value by multiplying a threshold value and a multiplier, the threshold value used to detect a signal degrade; and comparing a discarded data rate of a control traffic after a signal degrade with the first value to detect a restoration from the signal degrade. The methods and devices disclosed herein are suitable for precisely determining a signal degrade in a communication system.

25 Claims, 7 Drawing Sheets

SIGNAL DEGRADE DETECTING METHOD, SIGNAL RESTORATION DETECTING METHOD, DEVICES FOR THOSE METHODS, AND TRAFFIC TRANSMISSION SYSTEM

CROSS-REFERENCE TO RELATED APPLICATION

This application claims priority from Japanese Patent Application No. 2006-100621, filed on Mar. 31, 2006, in the Japanese Patent Office, the disclosure of which is hereby incorporated by reference in its entirety.

BACKGROUND OF THE INVENTION

1. Field of the Invention

Methods and apparatuses consistent with the present invention relate to a signal degrade detecting method, a signal restoration detecting method, devices for those methods, and a traffic transmission system, which are suitable for precisely discriminating the signal degrade of a transmission line.

2. Description of the Related Art

A packet network has been constructed in a communication system, and in recent years, demand for enhancing reliability in such networks has been increasing. There has been proposed a communication system in which the signal degrade of a traffic triggers a protection in the packet network as in the related art Synchronous Data Hierarchy (SDH) system. For example, in the Resilient Packet Ring (RPR) that is governed by the IEEE 802.17 standard, the signal degrade of the transmission line is defined as one of a number of protection triggers.

In the packet network described above, the packet communication system such as the ethernet which has a high affinity with the packet network has been frequently employed.

However, packet communication systems including the above-described ethernet present some problems.

A problem with such packet systems is that the packet communication system does not have a function of monitoring a bit error rate as is present in the SDH system. Thus, the signal degrade of the transmission line cannot be detected. Therefore, the transmission line that experiences signal degrade cannot be changed to the normal transmission line by the protection when a error attributable to the signal degrade of the transmission line occurs.

Another problem is that, in the packet communication system, the discarded data rate of the actual traffic, that is, how much traffic volume is not normally transmitted, cannot be measured even if the bit error rate is measured, since the traffic volume to be discarded depends on the length of the packets. Accordingly, even when the bit error rate is being measured, the discarded data rate of the traffic cannot be measured. In the packet communication system including ethernet, the signal degrade of the transmission line is detected by a Frame Check Sequence (FCS) error that performs error detection of the packet. Thus, even if only a part of a packet has an error, the entire packet is discarded. Thus, there arises a problem in that a state in which a large amount of traffic is discarded cannot be actually determined by merely measuring the bit error rate. Specifically, in the case where a large number of packets of the traffic are long length packets, and in the case where a large number of packets of the traffic are short length packets, even if the bit error rates are the same, the traffic volume to be discarded in the former case becomes larger. Also, there is the possibility that most of the packets of the traffic are discarded when a large number of the packets of the traffic are long length packets, even if the generated bit error rate is minimal.

Yet another problem with packet communication systems is that even if the traffic discarded data rate that is attributable to an FCS error of the traffic is measured and the occurrence of the signal degrade can be detected, after the protection of various protocols operate, normal traffic other than the control traffic does not flow in the transmission line. However, control traffic typically has a higher priority and therefore the control traffic continues to flow. As a result, most of the normal traffic disappears, and the discarded data rate of the normal traffic becomes essentially 0. In this case, the signal degrade of the transmission line cannot continue to be detected because there is no normal traffic flowing, and accordingly, a restoration from the signal degrade is mistakenly caused to be detected, and the protection is canceled even when the degrade is not really restored.

The cancellation of the protection leads to another problem that once the protection is canceled, the traffic before the occurrence of the protection flows again in the transmission line, the signal degrade of the transmission line is erroneously detected again, and the protection is erroneously generated again, etc.

SUMMARY OF THE INVENTION

Exemplary embodiments of the present invention addresses the above disadvantages and other disadvantages not described above. Also, the present invention is not required to overcome the disadvantages described above, and an exemplary embodiment of the present invention may not overcome any of the problems described above.

The present invention provides a signal degrade detecting method, a signal restoration detecting method, devices for those methods, and a traffic transmission system, which perform the detection of the signal degrade and restoration on the basis of the traffic volume to be discarded in the transmission line.

According to an aspect of the present invention, there is provided a method of detecting a signal degrade of transmission data, said method comprising measuring a discarded data rate of traffic; and comparing said discarded data rate with a threshold value to detect the signal degrade.

According to anther aspect of the present invention, there is provided a method of detecting a restoration from a signal degrade of transmission data, said method comprising obtaining a value by multiplying a threshold value, which is used to detect a signal degrade, by a multiplier; and comparing a discarded data rate of a control traffic after a signal degrade with said value to detect a restoration from the signal degrade.

According to another aspect of the present invention, there is provided a method of detecting a restoration from a signal degrade of transmission data, said method comprising measuring a discarded data rate of control traffic; if a signal degrade is detected, saving said discarded data rate as a threshold value; and comparing a discarded data rate of the control traffic measured after the signal degrade is detected with said threshold value to detect a restoration from the signal degrade.

According to another aspect of the present invention, there is provided a method of detecting a restoration from a signal degrade of transmission data, said method comprising measuring a data error rate of traffic; if a signal degrade is detected, saving said data error rate as a threshold value; and comparing a data error rate of the traffic measured after the signal degrade is detected with said threshold value to detect a restoration from the signal degrade.

According to another aspect of the present invention, there is provided a signal degrade detecting device, comprising measuring means for measuring a discarded data rate of traffic; threshold value output means for outputting a threshold value; and detecting means for detecting a signal degrade by comparing said discarded data rate with said threshold value.

According to another aspect of the present invention, there is provided a signal restoration detecting device, comprising measuring means for measuring a discarded data rate of control traffic; and detecting means for detecting a restoration from the signal degrade by comparing said discarded data rate of the control traffic with a value resulting from multiplying a threshold value which is used to detect a signal degrade by a multiplier.

According to another aspect of the present invention, there is provided a signal restoration detecting device, comprising measuring means for measuring a discarded data rate of control traffic; saving means for, if a signal degrade is detected, saving said discarded data rate as a threshold value; and detecting means for detecting a restoration from the signal degrade by comparing a discarded data rate of the control traffic measured after the signal degrade is detected with said threshold value.

According to another aspect of the present invention, there is provided a signal restoration detecting device, comprising measuring means for measuring data error rate of traffic; saving means for, if a signal degrade is detected, saving said data error rate as a threshold value; and detecting means for detecting a restoration from the signal degrade by comparing a data error rate of traffic measured after the signal degrade is detected with said threshold value.

BRIEF DESCRIPTION OF THE DRAWINGS

The above and other aspects of the present invention will become more apparent by describing in detail exemplary embodiments thereof with reference to the accompanying drawings, in which.

DETAILED DESCRIPTION OF EXEMPLARY EMBODIMENTS OF THE PRESENT INVENTION

Figure 1:
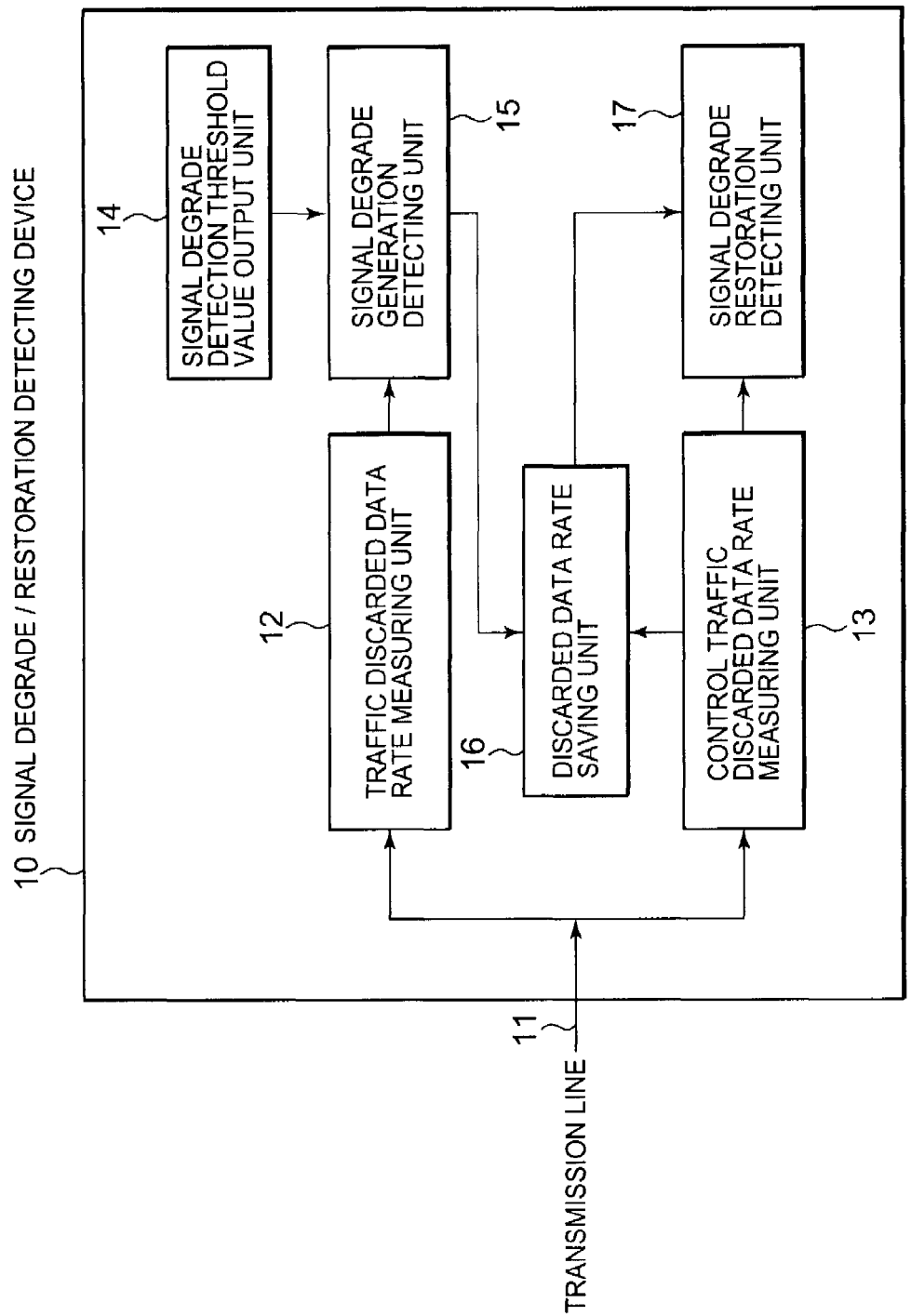
FIG. 1 is a diagram showing a configuration of a signal degrade/restoration detecting device according to an exemplary embodiment of the present invention.
Figure 2:
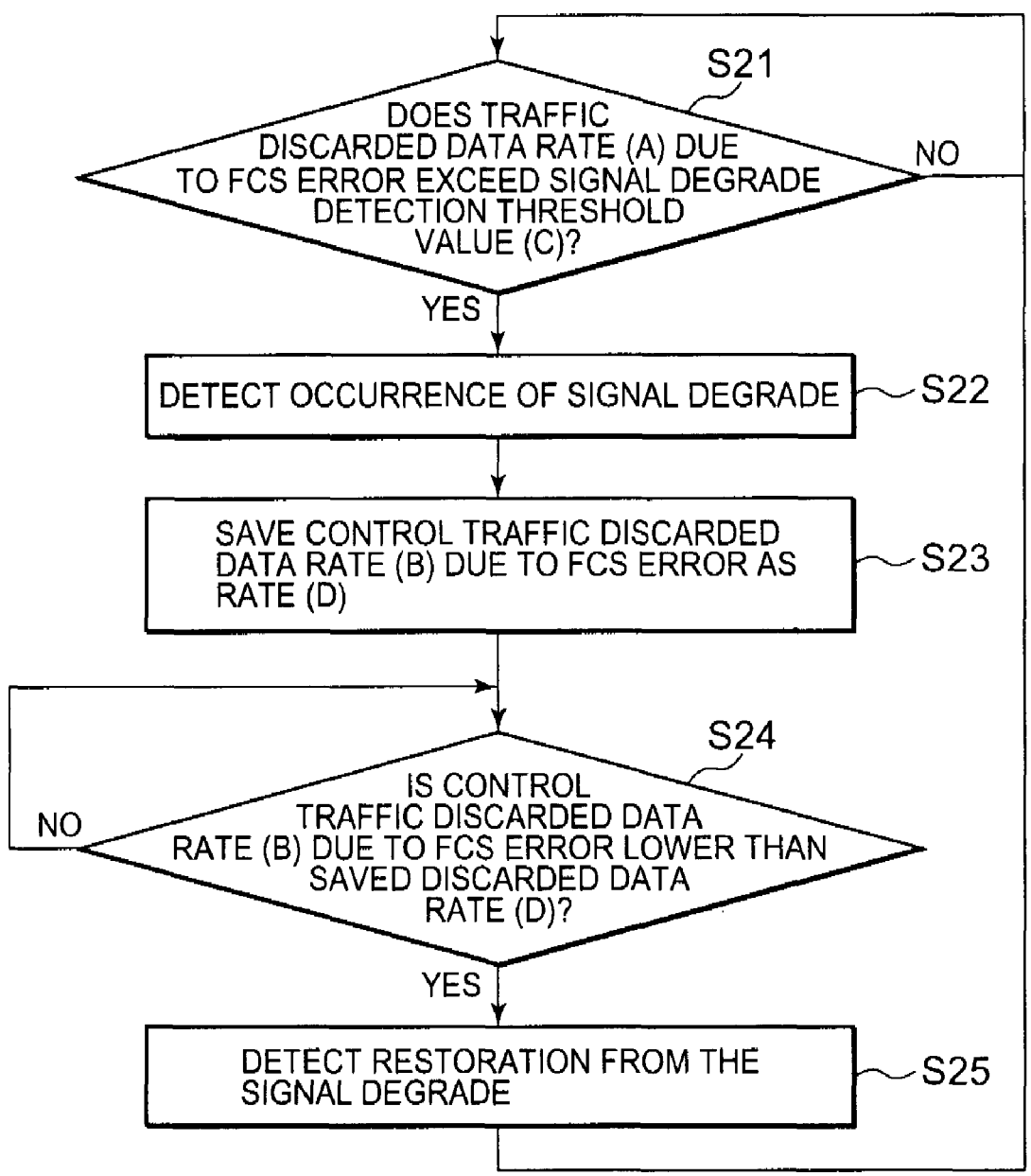
FIG. 2 is a flowchart showing a detecting process according to an exemplary embodiment of the present invention using the signal degrade/restoration detecting device of FIG. 1.

FIG. 1 is a diagram showing a configuration of a signal degrade/restoration detecting device according to an exemplary embodiment of the present invention, and FIG. 2 is a flowchart showing a detecting process using the signal degrade/restoration detecting device of FIG. 1.

As shown in FIG. 1, the signal degrade/restoration detecting device 10 comprises a traffic discarded data rate measuring unit 12 which measures a discarded data rate of traffic due to the FCS error, a control traffic discarded data rate measuring unit 13 which measures a discarded data rate of control traffic due to the FCS error, a signal degrade detection threshold value output unit 14, a signal degrade generation detecting unit 15, a discarded data rate saving unit 16, and a signal degrade restoration detecting unit 17. One having ordinary skill in the art will appreciate that the discarded data rate may be a discarded byte rate or a discarded bit rate. The inputs of the traffic discarded data rate measuring unit 12 and the control traffic discarded data rate measuring unit 13 are connected to a transmission line 11.

The traffic discarded data rate measuring unit 12 measures a discarded data rate A of the traffic due to the FCS error of traffic (i.e., a normal traffic and a control traffic) that flows in the transmission line 11.

The control traffic discarded data rate measuring unit 13 measures a discarded data rate B of the traffic due to the FCS error of the control traffic that flows in the transmission line 11.

The signal degrade detection threshold value output unit 14 stores a value, which is a threshold value C for detecting the occurrence of the signal degrade. The value may be predetermined, for example, by a host control unit (not shown) such as the transmitting device.

The signal degrade occurrence detecting unit 15 compares the discarded data rate A of the traffic due to the FCS error which is measured by the traffic discarded data rate measuring unit 12 with a threshold value C that is given from the signal degrade detection threshold value output unit 14 to detect an occurrence of the signal degrade. The signal degrade occurrence detecting unit 15 indicates a signal degrade when the rate A exceeds the threshold value C.

Upon detection of a signal degrade by the signal degrade occurrence detecting unit 15, the discarded data rate saving unit 16 records the discarded data rate B of the traffic due to the FCS error of the control traffic which is measured by the control traffic discarded data rate measuring unit 13 as a rate D. Thereafter, the discarded data rate of the control traffic keeps changing and continues to be measured by the control traffic discarded data rate measuring unit 13.

The signal degrade restoration detecting unit 17 compares the rate B that is measured by the control traffic discarded data rate measuring unit 13 with the rate D that is recorded in the discarded data rate saving unit 16 in order to detect a restoration from the signal degrade. The restoration from the signal degrade is detected if the rate B is lower than the rate D.

Subsequently, the operation of this exemplary embodiment will be described with reference to FIG. 2.

Referring to FIGS. 1 and 2, the discarded rate A of the traffic that flows in the transmitting line 11 is measured by the traffic discarded data rate measuring unit 12 (hereinafter referred to as "measuring unit 12).

The discarded rate B of the control traffic that flows in the transmitting line 11 is measured by the control traffic discarded data rate measuring unit 13 (hereinafter referred to as "measuring unit 13").

In the signal degrade occurrence detecting unit 15, the rate A that is measured by the measuring unit 12 is compared with the threshold value C from the signal degrade detection threshold value output unit 14 (operation S21) to determine if the rate A exceeds the threshold value C. If the rate A exceeds the threshold value C (yes in operation S21), the occurrence of the signal degrade is detected by the signal degrade occurrence detecting unit 15 (operation S22).

The rate B that is measured by the measuring unit 13 at the time of detecting the occurrence of the signal degrade is recorded in the discarded data rate saving unit 16 as rate D (operation S23).

The rate B continues to be measured. Thereafter, the rate B that is measured by the measuring unit 13 is compared with the rate D that is recorded in the discarded data rate saving unit 16 by the signal degrade restoration detecting unit 17 to determine whether the control traffic discarded data rate B is lower than the threshold value D (operation S24). If the rate B is lower than the threshold rate D (yes in operation S24), a restoration from the signal degrade is detected by the signal degrade restoration detecting unit 17 (operation S25).

As described above, according to the configuration of this exemplary embodiment, since the occurrence of the signal degrade is detected by using the discarded data rate due to the FCS error of the traffic that flows in the transmission line, it is possible to measure the traffic volume that has been actually discarded by the transmission line. Therefore, the occurrence of the signal degrade, that is, the occurrence of a state where no traffic flows can be detected even in a situation where a large amount of traffic is discarded by the FCS error and where the bit error rate is slight.

Moreover, when the signal degrade occurs in the traffic that flows in the transmission line, and the protection is effected on the traffic and the normal traffic does not flow, it is possible to detect the signal degrade and restoration.

According to the configuration of this exemplary embodiment, the discarded data rate of the control traffic at the time of occurrence of the signal degrade is recorded as rate D and used as the threshold value for the discarded data rate of the control traffic in order to detect the restoration of the signal degrade. Thus, it is measured whether the discarded data rate of the traffic that flows after occurrence of the signal degrade is lower than a threshold value of the signal degrade detection, or not. As a result, even if the traffic that flows after occurrence of the signal degrade changes, the occurrence of the signal degrade can be continuously detected, and the repetition of the occurrence of the signal degrade and the detection of the restoration can be prevented.

Figure 3:
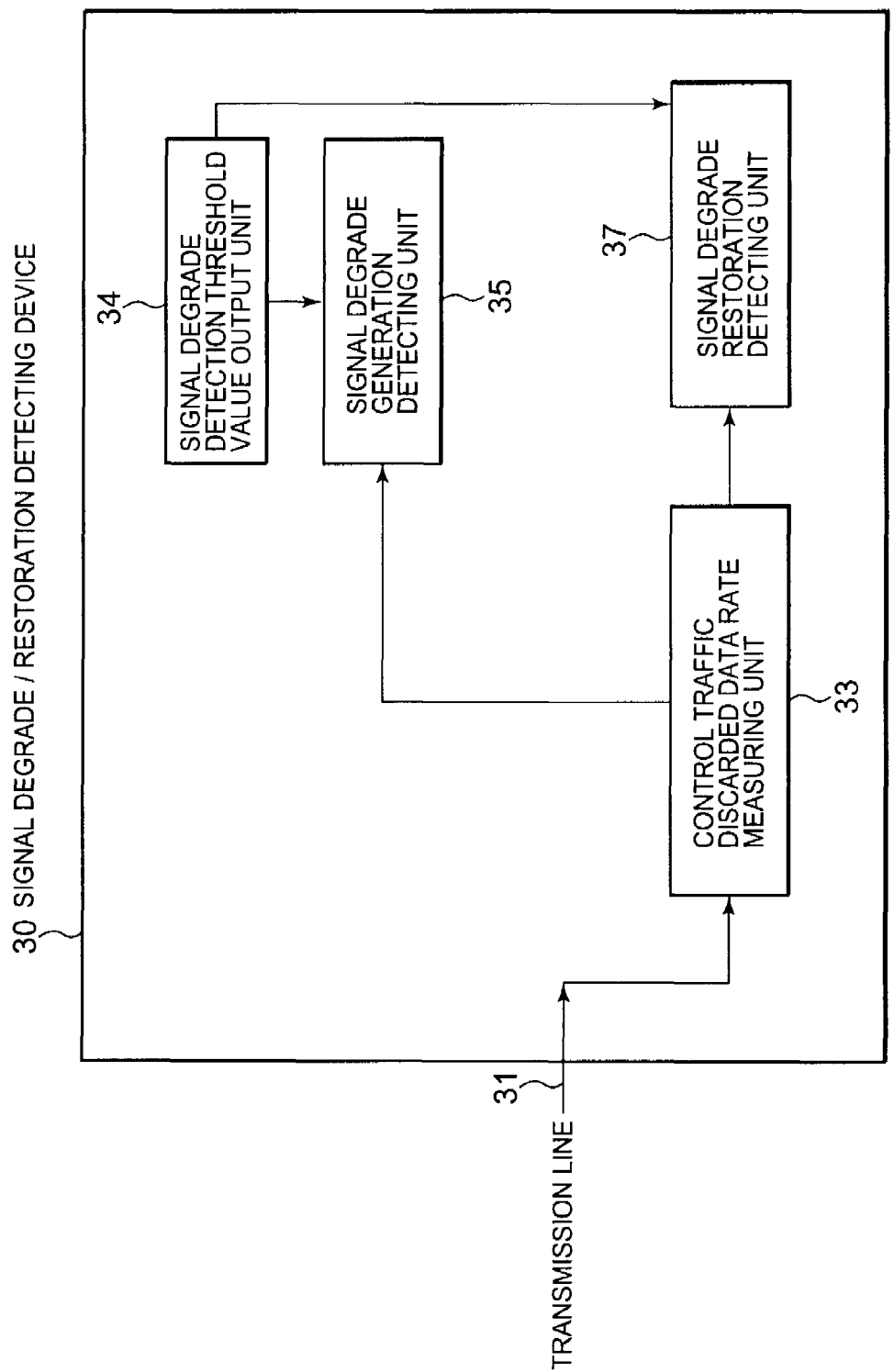
FIG. 3 is a diagram showing a configuration of a signal degrade/restoration detecting device according to another exemplary embodiment of the present invention.

FIG. 3 is a diagram showing a configuration of a signal degrade/restoration detecting device according to another exemplary embodiment of the present invention.

As shown in FIG. 3, a signal degrade/restoration detecting device 30 comprises a control traffic discarded data rate measuring unit 33 which measures a discarded data rate of control traffic due to the FCS error, a signal degrade detection threshold value output unit 34, a signal degrade generation detecting unit 35, and a signal degrade restoration detecting unit 37.

In this exemplary embodiment, the discarded data rate of the control traffic due to the FCS error is used to detect both of a degrade and restoration of the signal. Accordingly, as shown in FIG. 3, in this exemplary embodiment, the output of the control traffic discarded data rate measuring unit 33 is connected to the signal degrade occurrence detecting unit 35, and the output of a signal degrade detection threshold value output unit 34 is connected to the signal degrade restoration detecting unit 37.

Figure 4:
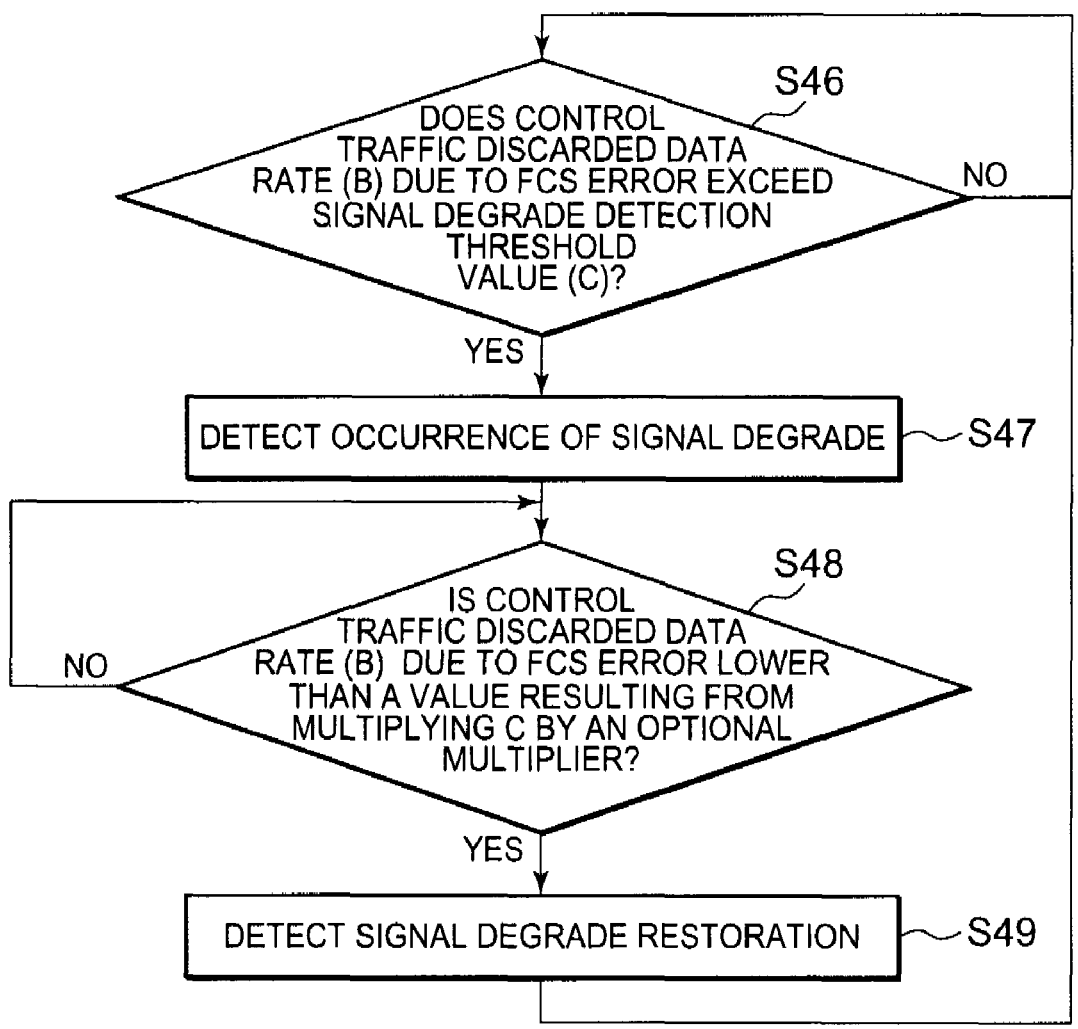
FIG. 4 is a flowchart showing a detecting process according to another exemplary embodiment of the present invention using the signal degrade/restoration detecting device of FIG. 3.

The operation of this exemplary embodiment will now be described with reference to FIG. 4.

The control traffic discarded data rate measuring unit 33 (hereinafter referred to as "measuring unit 33") measures a discarded data rate B due to the FCS error of the control traffic which flows in the transmission line 31.

In the signal degrade occurrence detecting unit 35, the rate B that is measured by the measuring unit 33 is compared with a threshold value C from the signal degrade detection threshold value output unit 34 to determine if the control traffic discarded data rate B due to FCS error exceeds the threshold value C (operation S46). If the rate B exceeds the threshold value C (YES in operation S46), it is determined that a signal degrade has occurred and the signal degrade is detected (operation S47).

Thereafter, the control traffic discarded data rate B continues to be measured by the measuring unit 33. The rate B that is measured by the measuring unit 33 is then compared with a value resulting from multiplying the threshold value C by an optional multiplier by the signal degrade restoration detecting unit 37 in order to determine if the rate B is lower than the value (operation S48). If the rate B is lower than the value resulting from multiplying the threshold value C by the optional multiplier, a restoration from the signal degrade is detected by the signal degrade restoration detecting unit 37 in operation S49.

As described above, the discarded data rate of the control traffic due to the FCS error is used in the detection of the signal degrade as well as the restoration, thereby making it possible to detect the signal degrade of the traffic and the restoration thereof.

Figure 5:
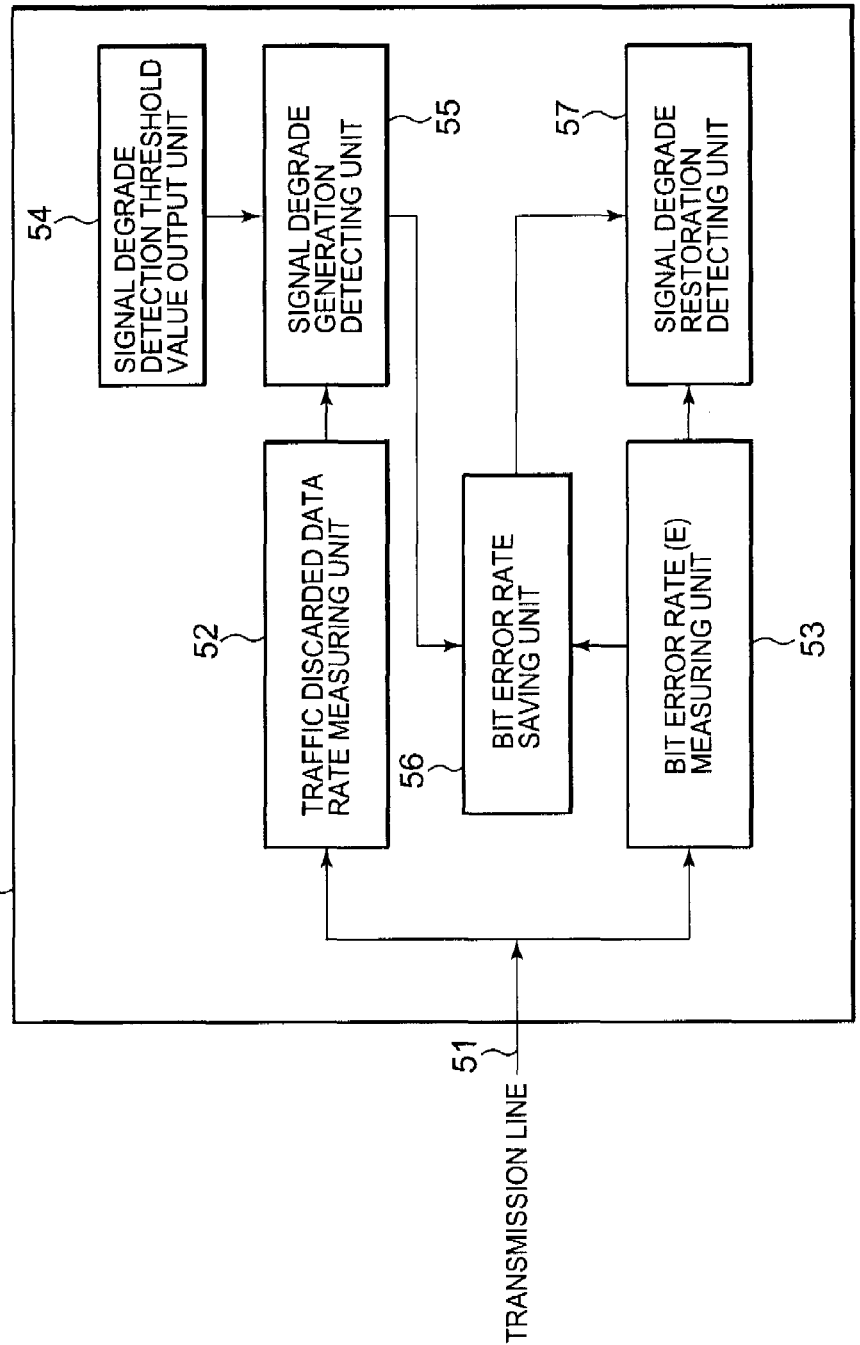
FIG. 5 is a diagram showing a configuration of a signal degrade/restoration detecting device according to yet another exemplary embodiment of the present invention.

FIG. 5 is a diagram showing a configuration of a signal degrade/restoration detecting device according to yet another exemplary embodiment of the present invention.

This exemplary embodiment uses a Synchronous Digital Hierarchy (SDH) based component to measure a bit error rate of the transmission.

As shown in FIG. 5, a signal degrade/restoration detecting unit 50 comprises a traffic discarded data rate measuring unit 52, a signal degrade detection threshold value output unit 54, a signal degrade generation detecting unit 55, a bit error rate measuring unit 53 that measures a bit error rate with the aid of a function of SDH instead of measuring the discarded data rate due to the FCS error of the control traffic that flows in the transmission line 51, a bit error rate saving unit 56 that saves the bit error rate that is measured by the bit error rate measuring unit 53 instead of saving the control traffic discarded data rate due to the FCS error at the time of detecting the occurrence of the signal degrade, and a signal degrade restoration detecting unit 57 that detects the restoration from the signal degrade by comparing a bit error rate E that is measured by the bit error rate measuring unit 53 and a bit error rate F that is saved in the bit error rate saving unit 56.

Figure 6:
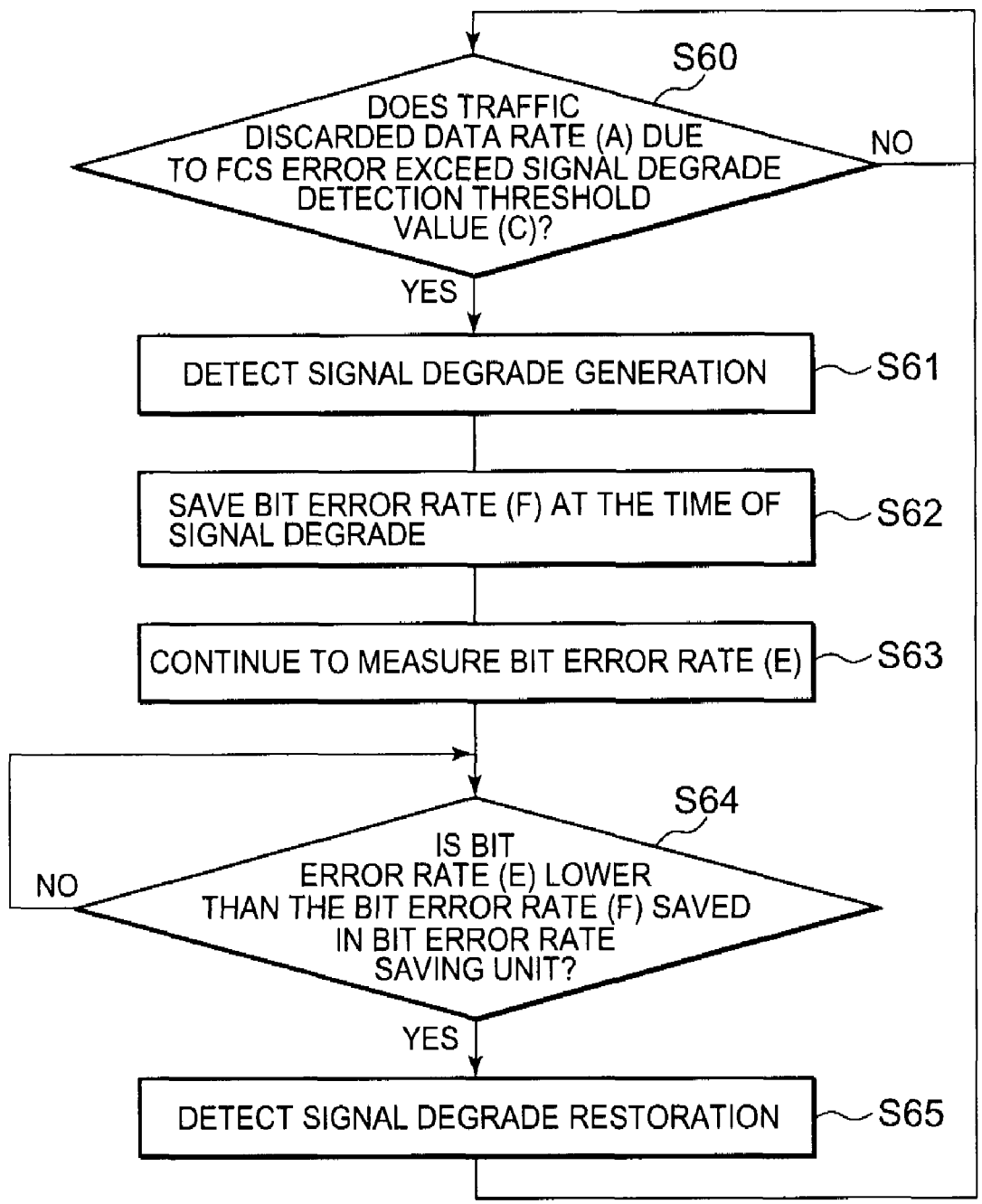
FIG. 6 is a flowchart showing a detecting process according to another exemplary embodiment of the present invention using the signal degrade/restoration detecting device of FIG. 5.

The operation of this embodiment will now be described with reference to FIG. 6.

The rate A that is measured by the traffic discarded data rate measuring unit 52 and the signal degrade detection threshold value C that is output from the signal degrade detection threshold value output unit 54 are compared with each other by the signal degrade occurrence detecting unit 55 in order to determine whether the rate A exceeds the threshold value C (operation S60). If the rate A exceeds the signal degrade detection threshold value C (YES in operation S60), a signal degrade is detected (operation S61).

The bit error rate F from the bit error rate measuring unit 53 at the time of detecting the signal degrade is saved in the bit error rate saving unit 56 (operation S62).

The bit error rate (E) continues to be measured after the time of detecting the signal degrade (operation S63). Thereafter, the bit error rate E that is measured by the bit error rate measuring unit 53 and the bit error rate F that is saved in the bit error rate saving unit 56 are compared with each other by the signal degrade restoration detecting unit 57 to determine if the bit error rate E is lower than the bit error rate F (operation S64). If the bit error rate E is lower than the bit error rate F (YES in operation S64), a restoration from the signal degrade of the normal traffic is detected (operation S65).

As described above, according to the configuration of this exemplary embodiment, the signal degrade of the traffic is detected by using the discarded data rate due to the FCS error of the traffic while the restoration from the signal degrade of the normal traffic is detected by using the bit error rate that is measured by the SDH system at the time of detecting the signal degrade and the bit error rate which is subsequently measured by the SDH system. Therefore, it is possible to detect the restoration of the signal degrade of the normal traffic without measuring the discarded data rate due to the FCS error of the control traffic as in the first exemplary embodiment.

Figure 7:
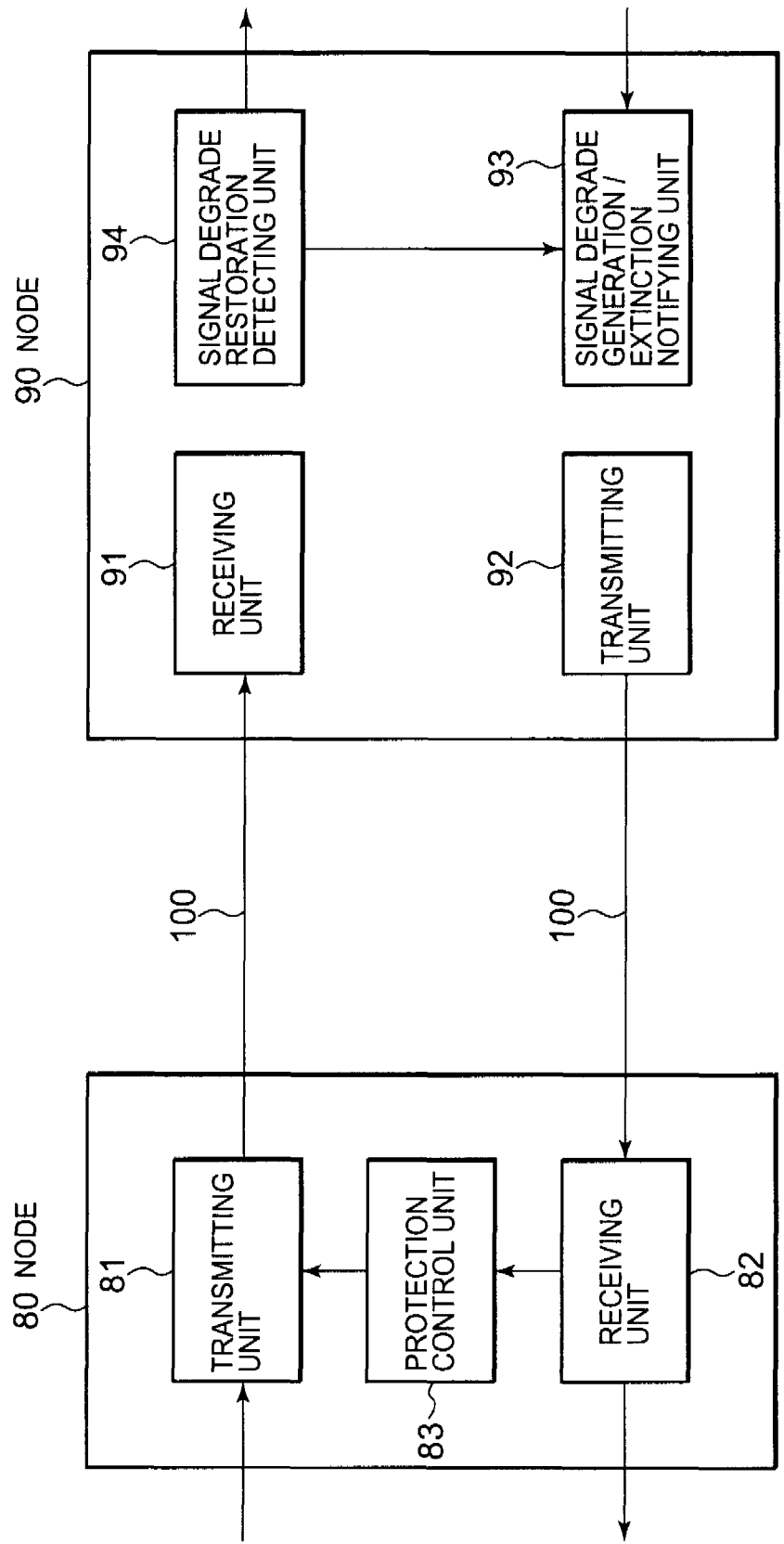
FIG. 7 is a diagram showing a configuration of a transmission system according to an exemplary embodiment of the present invention.

FIG. 7 is a diagram showing a configuration of a traffic transmission system according to yet another exemplary embodiment of the present invention.

A traffic transmission system 70 comprises a plurality of nodes in a network transmission system (i.e., a traffic transmission system), as shown in FIG. 7. That is, the traffic transmission system 70 comprises, for example, a transmitting side node 80 and a receiving side node 90 which are coupled together by transmission line 100. This configuration of nodes is only illustrative, and one having ordinary skill in the art would recognize that additional nodes are possible.

The transmitting side node 80 comprises a transmitting unit 81, a receiving unit 82, and a protection control unit 83.

The receiving side node comprises a receiving unit 91, a transmitting unit 92, a signal degrade/restoration detecting device 94, and a signal degrade occurrence/extinction notifying unit 93. Any of the above-described signal degrade/restoration detecting devices may be used as the signal degrade/restoration detecting device 94. That is, the signal degrade/restoration detecting device 94 may be the signal degrade/restoration detecting device 10 shown in FIG. 1, the signal degrade/restoration detecting device 30 shown in FIG. 3, or the signal degrade/restoration detecting device 50 shown in FIG. 5. The transmitting side node 80 and the receiving side node 90 are coupled to each other through the transmission line 100.

In the above-described system, the signal degrade/restoration detecting unit and signal degrade generation/extinction notifying unit are included as part of the receiving side node 90. However, as an alternative, it is possible to include a signal degrade/restoration detecting unit and a signal degrade generation/extinction notifying unit as part of the transmitting side node 80 instead of the receiving side node 90. Moreover, it is also possible to include a signal degrade/restoration detecting unit and a signal degrade generation/extinction notifying unit in both the transmitting side node and the receiving side node.

For convenience in describing the operation of the traffic transmission system 70, the normal traffic and the control traffic are transmitted from the transmitting unit 81 of the transmitting side node 80 through the transmission line 100 to the receiving unit 51 of the receiving side node 50.

The receiving unit 91 of the receiving side node 90 receives the normal traffic and the control traffic which flow in the transmission line 100, and transfers the traffic to the signal degrade/restoration detecting device 94. The transfer is performed by transferring the control traffic and the normal traffic to the signal degrade/restoration detecting device 94, or by transferring the control traffic to the signal degrade/restoration detecting device 94 according to the signal degrade/restoration detecting device used as the signal degrade/restoration detecting device 94.

If the signal degrade is detected by the signal degrade/restoration detecting device 94, signal degrade occurrence information is transferred to the signal degrade occurrence/extinction notifying unit 93. The signal degrade occurrence information that is transferred to the signal degrade occurrence/extinction notifying unit 93 is inserted into the control traffic that is transmitted from the transmitting unit 92 to the receiving unit 82 of the transmitting side node 80, and then the control traffic is transmitted from the transmitting unit 92 to the receiving unit 82 of the transmitting side node 80.

When the receiving unit 82 receives the control traffic, the signal degrade occurrence information in the control traffic is extracted and transferred to the protection control unit 83. The protection control unit 83 sets a protection with respect to the normal traffic that is transmitted from the transmitting unit 81 according to the received signal degrade occurrence information.

When a restoration from the signal degrade occurs, the restoration from the signal degrade is detected by the signal degrade/restoration detecting device 94, and the detection information is transferred to the signal degrade occurrence/extinction notifying unit 93. The signal degrade occurrence/extinction notifying unit 93 transfers the signal degrade extinction information to the transmitting unit 92. The signal degrade extinction information is inserted into the control traffic that is transmitted from the transmitting unit 92 to the receiving unit 82 of the transmitting side node 80, and then the control traffic is transmitted from the transmitting unit 92 to the receiving unit 82 of the transmitting side node 80.

When the receiving unit 82 receives the control traffic, the signal degrade restoration information in the control traffic is extracted and transferred to the protection control unit 83. The protection control unit 83 cancels the protection with respect to the normal traffic that is transmitted from the transmitting unit 81 according to the received signal degrade extinction information.

As described above, when the signal degrade is detected by the discarded data rate at the receiving side, the transmitting side is notified of the occurrence of the signal degrade, and the protection is effected on the normal traffic. Because the discarded data rate or the bit error rate at the time of signal degrade is saved, and the signal degrade restoration is precisely detected, the erroneous repetition of the occurrence of the signal degrade and the signal degrade restoration may be prevented.

In the above-described exemplary embodiments of the present invention, the various units may be implemented using one or more integrated circuits. For example, the measuring units, the output units, the detecting units and the saving units may be implemented using an Application Specific Integrated Circuit (ASIC). The various units may also be implemented as respective dedicated hardware circuits, or as selectively configurable hardware circuits, or as software executed by a processor (e.g., a central processing unit (CPU) or a digital signal processor (DSP)), or as a combination of any of these. In the case of implementation by software, it may be appreciated that the flowchart drawings may represent processing modules and/or information flow through the processing stages, but without any limitations as to execution timing.

In any of the above-described exemplary embodiments, the result of the detection may be stored in a recording medium.

While certain exemplary embodiments of the present invention have been described above, it is to be understood that numerous modifications to the exemplary embodiments of the invention will be apparent to those skilled in the art without departing from the spirit and scope of the present invention.

What is claimed is:

1. A method of detecting a signal degrade of transmission data, said method comprising:
   measuring a discarded data rate of traffic using a processor; and
   comparing said discarded data rate with a threshold value to detect the signal degrade,
   wherein said discarded data rate is calculated according to a Frame Check Sequence error.

2. The method according to claim 1, wherein the discarded data rate is a discarded bit rate.

3. The method according to claim 1, further comprising storing a result of the detection in a storage medium.

4. A method of detecting a restoration from a signal degrade of transmission data, said method comprising:
   obtaining a first value by multiplying a threshold value and a multiplier using a processor, the threshold value used to detect the signal degrade; and
   comparing a discarded data rate of a control traffic after the signal degrade with said first value to detect a restoration from the signal degrade.

5. The method according to claim 4, wherein said discarded data rate is a discarded byte rate calculated according to a frame check sequence error.

6. The method according to claim 4, wherein the discarded data rate is a discarded bit rate.

7. The method according to claim 4, further comprising storing a result of the detection in a storage medium.

8. A method of detecting a restoration from a signal degrade of transmission data, said method comprising:
   measuring a discarded data rate of control traffic using a processor;
   determining the signal degrade of transmission data based on the measured discarded data rate of control traffic;
   if determined that the signal degrade occurred, saving said discarded data rate corresponding to the signal degrade as a threshold value; and
   comparing a discarded data rate of the control traffic measured after the signal degrade is determined with said threshold value to detect a restoration from the signal degrade.

9. The method according to claim 8, wherein said discarded data rate is a discarded byte rate calculated according to a Frame Check Sequence error.

10. The method according to claim 8, wherein the discarded data rate is a discarded bit rate.

11. The method according to claim 8, further comprising storing a result of the determining in a storage medium.

12. A method of detecting a restoration from a signal degrade of transmission data, said method comprising:
   measuring, using a processor, a discarded data rate of traffic, the discarded data rate calculated based on a Frame Check Sequence;
   determining the signal degrade of transmission data based on the measured data discarded data rate of traffic;
   if determined that the signal degrade occurred, saving a data error rate corresponding to the signal degrade as a threshold value; and
   comparing a data error rate of the traffic measured after the signal degrade is determined with said threshold value to detect a restoration from the signal degrade.

13. The method according to claim 12, wherein said data error rate is a bit error rate.

14. The method according to claim 12, further comprising storing a result of the determination in a storage medium.

15. A signal degrade detecting device, comprising:
   measuring means for measuring a discarded data rate of traffic;
   threshold value output means for outputting a threshold value; and
   detecting means for detecting a signal degrade by comparing said discarded data rate with said threshold value,
   wherein said discarded data rate is calculated according to a Frame Check Sequence error.

16. A signal restoration detecting device, comprising:
   measuring means for measuring a discarded data rate of control traffic; and
   detecting means for detecting a restoration from a signal degrade by comparing said discarded data rate of the control traffic with a first value resulting from multiplying a threshold value and a multiplier, said threshold value used to detect the signal degrade.

17. The signal degrade detecting device according to claim 16, wherein said discarded data rate is a discarded byte rate calculated according to a frame check sequence error.

18. A signal restoration detecting device, comprising:
   measuring means for measuring a discarded data rate of control traffic;
   first detecting means for detecting a signal degrade of transmission data based on the measured discarded data rate of control traffic;
   saving means for, if a signal degrade is detected by the first detecting means, saving said discarded data rate corresponding to the signal degrade as a threshold value; and
   second detecting means for detecting a restoration from the signal degrade by comparing a discarded data rate of the control traffic measured after the signal degrade is detected with the saved threshold value.

19. The signal degrade detecting device according to claim 18, wherein the discarded data rate is a discarded byte rate calculated according to a frame check sequence error.

20. A signal restoration detecting device, comprising:
   measuring means for measuring a discarded data rate of traffic, the discarded data rate calculated according to a Frame Check Sequence;
   first detecting means for detecting a signal degrade of transmission data based on the measured discarded data rate of traffic;
   saving means for, if a signal degrade is detected by the first detecting means, saving a data error rate corresponding to the signal degrade as a threshold value; and
   second detecting means for detecting a restoration from the signal degrade by comparing a data error rate of traffic measured after the signal degrade is detected with said threshold value.

21. The signal restoration detecting device according to claim 20, wherein the data error rate is a bit error rate.

22. A signal degrade detecting device, comprising:
   measuring unit which is configured to measure a discarded data rate of traffic;
   threshold value output unit which is configured to output a threshold value; and
   detecting unit which is configured to detect a signal degrade by comparing said discarded data rate with said threshold value,
   wherein said discarded data rate is calculated according to a Frame Check Sequence error.

23. A signal restoration detecting device, comprising:
   measuring unit which is configured to measure a discarded data rate of control traffic; and detecting unit which is configured to detect a restoration from the signal degrade by comparing said discarded data rate of the control traffic with a value resulting from multiplying a threshold value and a multiplier, the threshold value used to detect a signal degrade.

24. A signal restoration detecting device, comprising:

measuring unit which is configured to measure a discarded data rate of control traffic;

first detecting unit which is configured to detect a signal degrade of transmission data based on the measured discarded data rate of control traffic;

saving unit which is configured to, if a signal degrade is detected by the first detecting unit, save said discarded data rate corresponding to the signal degrade of transmission data as a threshold value; and second detecting unit which is configured to detect a restoration from the signal degrade by comparing a discarded data rate of the control traffic measured after the signal degrade is detected with said threshold value.

25. A signal restoration detecting device, comprising:

measuring unit which is configured to measure a discarded data rate of traffic, the discarded data rate calculated using a Frame Check Sequence;

first detecting unit which is configured to detect a signal degrade of transmission data based on the measured discarded data rate of traffic;

saving unit which is configured to, if a signal degrade is detected, save a data error rate corresponding to the signal degrade as a threshold value; and second detecting unit which is configured to detect a restoration from the signal degrade by comparing a data error rate of traffic measured after the signal degrade is detected with said threshold value.

* * * * *